US008270324B2

(12) United States Patent
Li et al.

(10) Patent No.: US 8,270,324 B2
(45) Date of Patent: Sep. 18, 2012

(54) METHOD FOR BEARER CONTROL AND DELETION, DATA DISTRIBUTION, AND MODIFICATION

(75) Inventors: Jianyong Li, Shenzhen (CN); Wei Zhang, Shenzhen (CN); Wenliang Liang, Shenzhen (CN); Liang Gu, Shenzhen (CN); Chengyan Feng, Shenzhen (CN); Yuankui Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 538 days.

(21) Appl. No.: 12/411,989

(22) Filed: Mar. 26, 2009

(65) Prior Publication Data

US 2009/0238107 A1    Sep. 24, 2009

Related U.S. Application Data

(63) Continuation-in-part of application No. PCT/CN2007/070794, filed on Sep. 26, 2007.

(30) Foreign Application Priority Data

Sep. 26, 2006  (CN) .......................... 2006 1 0127082
Oct. 13, 2006  (CN) .......................... 2006 1 0131988
Feb. 9, 2007   (CN) .......................... 2007 1 0079033

(51) Int. Cl.
*H04B 7/00* (2006.01)

(52) U.S. Cl. ...................................................... 370/310

(58) Field of Classification Search .................. 370/480, 370/479
See application file for complete search history.

(56) References Cited

U.S. PATENT DOCUMENTS

2007/0086359 A1* 4/2007 Yaqub ........................... 370/254
2007/0217436 A1* 9/2007 Markley et al. ............... 370/401

FOREIGN PATENT DOCUMENTS

| CN | 1450752 | 10/2003 |
|---|---|---|
| CN | 1523798 | 8/2004 |
| CN | 1642130 | 7/2005 |
| CN | 1717069 | 1/2006 |
| CN | 1758626 | 4/2006 |

(Continued)

OTHER PUBLICATIONS

Written Opinion of the International Searching Authority, mailed Jan. 10, 2008, in corresponding PCT Application No. PCT/CN2007/070794 (5 pp.).

(Continued)

*Primary Examiner* — Chi Pham
*Assistant Examiner* — Fan Ng
(74) *Attorney, Agent, or Firm* — Staas & Halsey LLP (57) ABSTRACT

A method for bearer control, bearer deletion, data distribution, and multicast broadcast service MBS modification are described, which enables MBS data to be received successfully and MBS sessions to be managed effectively. According to the invention involved in a communication field, service distribution information for one MBS service is maintained within MBS upstream and downstream nodes, and the MBS service distribution information is composed of a list of downstream nodes corresponding to the respective nodes. A corresponding service bearer and data distribution relation of the MBS are established and maintained based on the service distribution information, and service data of the MBS is distributed based on the service bearer and the data distribution relation. The MBS distribution information is pre-configured and/or dynamically maintained, the establishment of the service bearer is pre-configured and/or dynamically maintained, and the data distribution relation is pre-configured, distributed by default, and/or dynamically maintained.

7 Claims, 6 Drawing Sheets

OTHER PUBLICATIONS

Office Action, mailed Feb. 24, 2011, in corresponding Chinese Application No. 200710079033.X (21 pp.).

Office Action, mailed Apr. 21, 2011, in corresponding Chinese Application No. 200610127082.1 (12 pp.).

Rejection Decision, mailed Sep. 23, 2011, in corresponding Chinese Application No. 20061012782.1 (15 pp.).

*WiMAX Forum Network Architecture (Stage 2: Architecture Tenets, Reference Model and Reference Points) [Part 2] Release 1.0.0*, WiMAX Forum, Mar. 28, 2007, pp. 1-153.

*802.16 IEEE Standard for Local and metropolitan area networks, Part 16: Air Interface for Fixed Broadband Wireless Access Systems*, IEEE Computer Society, Oct. 1, 2004, pp. 1-857.

*802.16e IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendrum 1*, IEEE Computer Society, Feb. 28, 2006, pp. 1-822.

\* cited by examiner

FIG. 1

(Related art)

METHOD FOR BEARER CONTROL AND DELETION, DATA DISTRIBUTION, AND MODIFICATION

CROSS REFERENCE TO RELATED APPLICATIONS

This application is a continuation in part of International Application No. PCT/CN2007/070794, filed on Sep. 26, 2007, which claims the benefit of Chinese Patent Application Nos. 200610127082.1, 200610131988.0, and 200710079033.X, filed on Sep. 26, 2006, Oct. 13, 2006, and Feb. 9, 2007, respectively. All of the afore-mentioned applications are hereby incorporated by reference in their entireties.

BACKGROUND OF THE INVENTION

1. Field of the Technology

The present invention relates to the field of communications, and more particularly to a method for bearer control, bearer deletion, data distribution, and multicast broadcast service modification.

2. Background of the Invention

IEEE802.16 is issued by the Institute of Electrical and Electronics Engineers (IEEE) in December of 2001 for providing standards of last mile wireless broadband access in a metropolitan area network (MAN).

Meanwhile, numerous equipment and component providers set up the Worldwide Interoperability for Microwave Access (WiMAX) forum organization aimed at accelerating the deployment of a broadband wireless network based on the above IEEE802.16 series standards by ensuring the compatibility and interoperability between broadband wireless access equipments. Therefore, in common cases, a system for realizing the wireless broadband access based on the IEEE802.16 series standards is called a WiMAX system.

Figure 1:
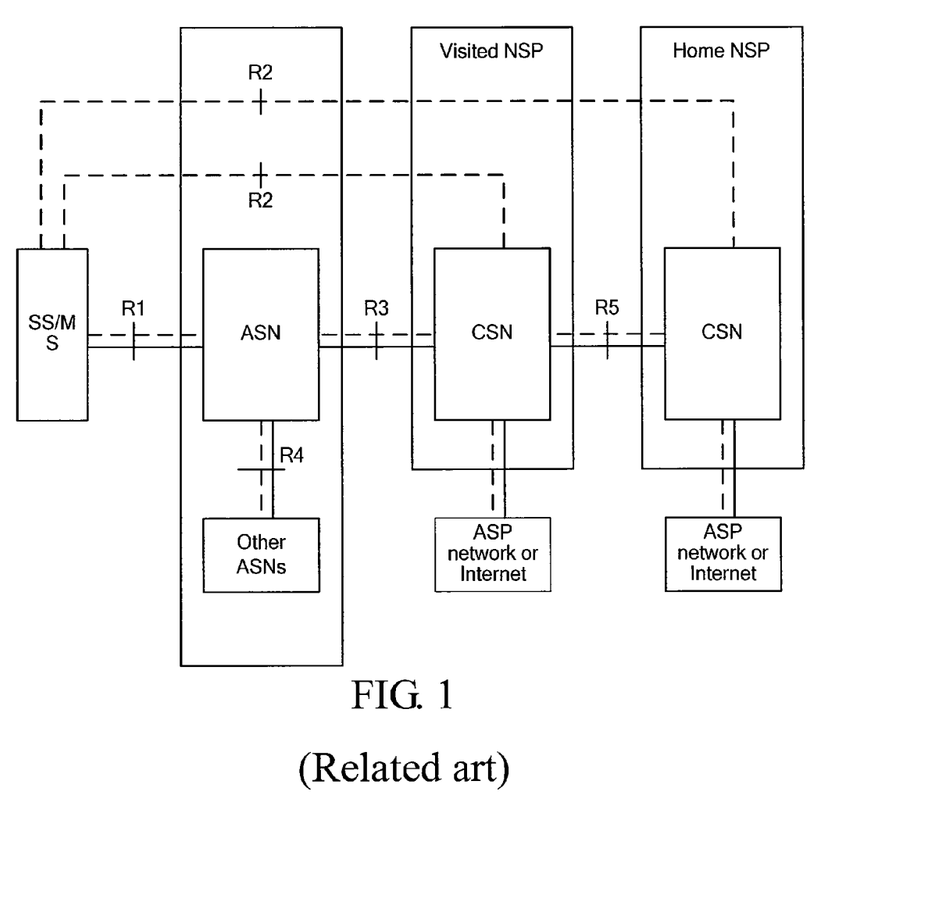
FIG. 1 is a schematic view illustrating an architecture of a WiMAX network in the prior art.

FIG. 1 shows a WiMAX end-to-end reference model. As shown in the figure, the WiMAX mainly includes a mobile station (MS)/subscriber station (SS), an access service network (ASN), and a connectivity service network (CSN).

The ASN is defined as a network function collection for providing a wireless access service to a WiMAX user terminal, and includes network elements of a base station (BS) and an ASN gateway (ASN-GW). One ASN may be shared by multiple CSNs.

The main functions of the ASN include functions of the BS and the ASN-GW. The functions of the BS include provision of an L2 connection between the BS and the SS/MS, wireless resource management, measurement and power control, and compression and encryption of air interface data. The functions of the ASN-GW include provision of a proxy function for authentication, authorization, and accounting functions of the SS/MS, support of the network discovery and selection of an NSP, and provision of a relay function, for example, IP address allocation of L3 information for the SS.

The CSN is defined to provide an IP connection service to the WiMAX user terminal. The functions of the CSN mainly include: IP address allocation of the SS/MS, Internet access, functioning as an authentication, authorization, and accounting (AAA) proxy or server, user-based authorization control, tunnel from the ASN to the CSN, accounting of a WiMAX user and settlement between operators, tunnel between CSNs in roaming cases, handover between ASNs, and various WiMAX services (for example, location-based services, multimedia multicast and broadcast services, and IP multimedia subsystem services).

The MS/SS is a (mobile) user equipment with which the user accesses a WiMAX network.

The WiMAX network wireless side is a wireless MAN access technique based on the IEEE 802.16d/e standards and nowadays mainly conforms to the IEEE 802.16-2004 (802.16d) standard formulated in July of 2004. The working frequency band of the IEEE 802.16-2004 (802.16d) standard is from 2 GHz to 11 GHz, and is a mixed frequency band of authorization and non-authorization. Orthogonal frequency division multiplexing (OFDM) and orthogonal frequency multiple access (OFDMA) physical layers are employed to effectively resist multipath fading. In the case of a most preferred channel fading, the transmission rate approaches to 75 Mbps. The IEEE 802.16-2004 (802.16d) standard is used in the non-line-of-sight point-to-multipoint technology in the MAN, and is mainly in the forms of fixed and nomadic networks. Technologies supporting simple mobile communication and full mobile communication have been added to the IEEE 802.16e under discussion.

With the rapid development of Internet, the point-to-point communication can no longer satisfy people's demand for mobile communications. As a result, a great many multimedia services spring up. Among them, some application services, for example, video on demand (VOD), television broadcasting, video conference, online education, and interactive games, require multiple users to receive the same data at the same time. Compared with general data, these mobile multimedia services are mainly characterized by large amount of data, long duration, and sensitivity to time delay. The current IP multicast technology is only applicable to a wired IP network instead of a mobile network, because the mobile network has specific network structures, functional entities, and wireless interfaces which are all different from those of the wired IP network.

In order to effectively utilize mobile network resources, a multicast broadcast service (MBS) is introduced into the WiMAX, i.e., a point-to-multipoint service in which one data source sends data to multiple users is provided in a mobile network so as to share the network resources and improve the utilization of the network resources, especially air interface resources. The MBS introduced into the WiMAX enables not only multicast and broadcast of plain text, low-rate messages, but also multicast and broadcast of high-speed multimedia services, which no doubt conforms to the trend of development of mobile data in the future.

The MBS based on the WiMAX network supports two access modes: single-BS access and multi-BS access. In the multi-BS access mode, all BSs in one MBS zone (identified by an MBS_zone ID) use the same multicast connection ID (MCID) and MBS group security association (MBS GSA) to send contents of the same MBS flow, and a terminal that has registered an MBS service can receive the MBS contents via multiple BSs in the MBS zone. Moreover, when moving across the BSs in the MBS zone, the terminal in an idle mode receives the MBS without being affected when connection reestablishment is not needed, thereby realizing a seamless handover of the MBS.

Some globally defined service flows may carry broadcast or multicast information of multiple SSs/MSs. These service flows have quality of service (QoS) parameters and may further need to be encrypted by a globally defined data encryption key. In the WiMAX network, a service flow identifier (SFID) is adopted to identify a unidirectional service flow and a connection ID (CID) is adopted to identify a connection. All service flows are transmitted through a media access control (MAC) layer connection at an air interface, i.e., the SFID needs to be mapped to a CID. The MCID is a CID dedicated for multicast connection. Meanwhile, the 802.16e stipulates the use of an MBS contents ID to identify a multicast service. A protocol data unit (PDU) transmitted on one MCID includes one or more MBSs.

In order to use a macro diversity to improve the reception performance, an MBS mapping (MBS-MAP) message is introduced into the IEEE802.16. The message is transmitted in an MBS zone for notifying the physical channel resource allocated to a specific multicast CID in a given MBS zone. The MBS-MAP message adopts an MBS_DATA_IE to further designate a modulation and coding mode (DIUC) and power offset (boosting) used by various service data blocks on a designated physical channel resource (Burst) and locations of the next MBS service frame and the next MBS-MAP message frame. Therefore, as long as the MBS-MAP message is detected correctly, the terminal can obtain the physical channel resource corresponding to the multicast connection expected to be received according to the message, get the modulation and coding mode, power offset, etc., used on the physical channel resource, and further determine the location of the MBS frame including the multicast connection in the next frame, so as to normally receive data through multicast connection.

An air interface link layer connection ID may be a CID or an MCID. One air interface link layer connection may bear one or more upper layer data flows. The standard defines the use of a contents ID to distinguish different upper layer data flows borne by the air interface link layer connection. When one air interface link layer connection bears multiple contents, a logical channel ID (LCID) is used at the link layer to identify the contents, so as to indicate what contents the current link layer packet bears. The LCID and the MCID uniquely correspond to one contents ID.

One MBS zone is managed by one MBS proxy. The MBS proxy maintains MCID resources and may be located on an ASN GW, an MBS server, or an independent functional entity.

However, specific schemes on how to establish and remove a bearer at the start or end of an MBS session have not been yet provided. When an MBS service at the network side changes, resources (including the establishment of a tunnel) reserved for the MBS service cannot be modified, either, which affects the realization of the MBS service and even interrupts the MBS service to cause a waste of resources.

SUMMARY OF THE INVENTION

Accordingly, the present invention is directed to a method for bearer control, bearer deletion, and data distribution, so as to enable MBS data to be received successfully and the MBS session to be managed effectively.

The present invention is further directed to a method for MBS service modification, capable of modifying resources stored and reserved for an MBS service in time when the MBS service at a network side changes, so as to improve the utilization of the resources.

In order to achieve the above objectives, in an embodiment, a method for bearer control and data distribution is provided. The method includes: storing, in at least one node of a multicast broadcast service (MBS), MBS service distribution information including information denoting upstream and downstream relations between nodes of the MBS service; establishing and maintaining a service bearer and a data distribution relation corresponding to the MBS according to the MBS service distribution information; and distributing service data of the MBS according to the service bearer and the data distribution relation.

In an embodiment, a method for bearer deletion and data distribution is further provided. The method includes: sending, by an upstream node to a downstream node or by a downstream node to an upstream node, a message indicating to stop sending service data of an MBS to the downstream node carrying identification information of the MBS; and at least performing, by the downstream node or the upstream node, one of the following steps after receiving the message: deleting a bearer of an MBS corresponding to the identification information of the MBS with the upstream node or the downstream node; updating a data distribution relation corresponding to the identification information of the MBS of the downstream node and labeling it as no longer distributing data to the node; and deleting the downstream node from a list of downstream nodes receiving the MBS corresponding to the identification information of the MBS.

In an embodiment, a method for MBS modification is further adapted to modify an MBS service at a network side. The method includes: receiving, by a downstream node, a service modification request for modifying an MBS bearer sent from an upstream node; modifying, by the downstream node, resources stored and reserved for the MBS service according to the service modification request; and feeding back, by the downstream node, a response to the MBS service modification request to the upstream node.

It can be seen from comparison that, in the technical schemes provided by the embodiment of the present invention, for a certain MBS service, MBS service distribution information is stored in at least one node of the MBS and consists of information about upstream and downstream relations between nodes of the MBS service. A service bearer corresponding to the MBS is established depending on the service distribution information. Based on the MBS service bearer and data distribution relation between the nodes, service data of the MBS is distributed between the MBS upstream and downstream nodes, so that the MBS data can be transmitted and received successfully. Additionally, in another embodiment of the present invention, after the MBS service ends or when the network side intends to change the configuration of the MBS service, the network side may modify related resources stored and reserved for the MBS service according to a received service modification request for modifying the MBS bearer, so as to improve the utilization of the resources.

DETAILED DESCRIPTION OF THE EMBODIMENTS

In order to make the objectives, technical schemes, and advantages of the present invention comprehensible, embodiments accompanied with figures are described in detail below.

In the embodiments of the present invention, an MBS bearer between MBS nodes is established according to service distribution information. The MBS node is at least one of a BS, a gateway, an MBS proxy, and an MBS server.

Service distribution information is composed of bearer relations between upstream and downstream nodes at various layers. The bearer relations between the upstream and downstream nodes may be pre-configured or dynamically maintained.

Bearers between the upstream and downstream nodes are maintained according to their bearer relations, and the maintenance includes bearer establishment and bearer release. For a node of which the bearer relation is pre-configured, the bearers between the node and downstream nodes thereof are established or released in a unified way, while for a node of which the bearer relation is dynamically maintained, the bearers between the node and downstream nodes thereof are maintained independently.

The service distribution information consisting of the bearer relations between upstream and downstream nodes at various layers may be fully pre-configured, fully dynamically maintained, or partly pre-configured and partly dynamically maintained. The service distribution information may be collectively maintained by a certain node, for example, the MBS server or the MBS proxy, or distributed at nodes of various layers. Corresponding to the aforementioned bearer relation, for each MBS supported by the upstream node, the upstream node maintains a corresponding list of downstream nodes receiving the MBS. The list of nodes may be pre-configured or dynamically maintained.

For the service distribution information that is fully pre-configured, the service distribution information may be collectively configured at a certain node, for example, the MBS server or the MBS proxy, or dispersedly configured at nodes of various layers. For the service distribution information that is fully dynamically maintained, the maintenance of the service distribution information is dispersed at nodes of various layers, in which the node dynamically maintains a downstream node list thereof to constitute dynamic service distribution information. For the service distribution information that is partly pre-configured and partly dynamically maintained, the maintenance of the service distribution information is dispersed at nodes of various layers, in which downlink node lists on a part of the nodes are dynamically maintained, and downlink node lists on the other part of the nodes are pre-configured.

A downstream node notifies an upstream node to maintain a downstream node list thereof through a registration or deregistration process. When a certain node satisfies a specific condition, for example, if the node desires to bear the MBS, the node needs to register with an upstream node thereof, and the upstream node adds the node to the corresponding downstream node list. If the upstream node has not registered with an upstream node thereof, the upstream node needs to register with the upstream node thereof. When the user joins the service or moves, the registration flow may be implicitly realized by the flow in which the user terminal joins the MBS or the processing flow in which the user terminal moves. When a certain node satisfies a specific condition, for example, if the node no longer desires to bear the MBS, the node may initiate a deregistration flow to an upstream node for notifying the upstream node to delete the node from a corresponding downstream node list thereof.

The bearer is established depending on and in conformity to the service distribution information, and may be fully pre-established, fully dynamically established, or partly dynamically established. The case in which the bearer is fully pre-established depends upon fully pre-configured service distribution information. When the MBS server/MBS proxy satisfies a specific condition, for example, a session starts, the establishment of bearers between all nodes is triggered. If the bearer is established fully dynamically, bearers are only established between nodes required to bear specific services according to the service distribution information. If the MBS session has started when information of a certain node is added to the service distribution information, a bearer between an upstream node and the node can be established immediately. If the MBS session has not started when a certain node is added to the service distribution information, a corresponding bearer may be established immediately or the corresponding bearer may be established before the MBS service session starts. If a bearer between a certain node and an upstream node thereof has been established before the node is deleted from the service distribution information, a bearer release process needs to be triggered at this point. The bearer release process may be initiated by the upstream node or by a downstream node. The bearer release process may also be combined with the process in which the node exits the service distribution information. If a part of bearer relations in the service distribution information is pre-configured, the bearer may be partly pre-established.

The bearer release process is a reverse process of bearer establishment. The bearer release may be triggered by the MBS server. When a certain MBS session ends, related nodes in all downstream node lists need to release a bearer corresponding to the service, and after receiving a bearer release request, the upstream nodes release the bearers between themselves and downstream nodes according to the maintained downstream node list. When the bearer is established dynamically, the bearer release flow may also be triggered when a downstream node that has established a bearer exits the service distribution information. The bearer release process may also be combined with the process in which the downstream node exits the service distribution information.

A data distribution relation corresponding to the MBS is established depending on the MBS service distribution information. The MBS node distributes MBS data depending on bearer establishment. The MBS node may distribute data immediately after the bearer is established, or not distribute data for the moment after the bearer is established until a certain downstream node has a service demand. The upstream node needs to maintain the data distribution relation of the nodes in the downstream node list while maintaining the list, so as to identify whether to distribute data to the node or not. The maintenance of the data distribution relation may be triggered through a registration flow and a deregistration flow of the node. In the case that the nodes in the list are all forwarded by default, the data distribution relation may be denoted implicitly without being independently maintained. This distribution relation may also be pre-configured.

The establishment of the MBS service bearer and data distribution relation may be implemented in three manners according to triggering conditions: (1) triggering by a registration flow of a downstream node to an upstream node; (2) triggering by the MBS server when the upstream node satisfies a certain condition (for example, the MBS session starts); and (3) the related bearer and data distribution relation are established through configuration without being triggered by signaling.

Figure 2:
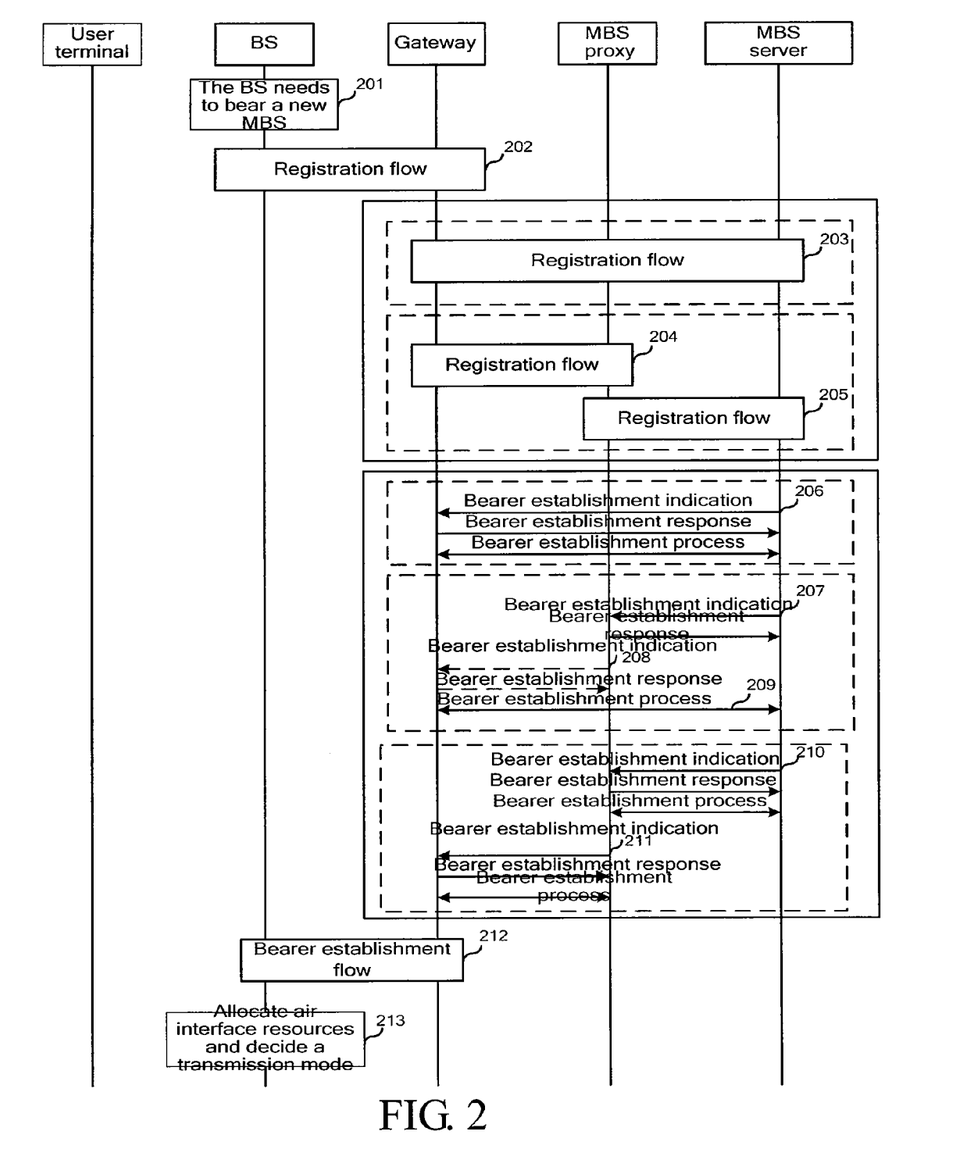
FIG. 2 is a flow chart of a method for bearer control and data distribution according to a first embodiment of the present invention.

Based on the comprehension of the above contents, a first embodiment of the present invention is illustrated in detail below with reference to the drawings. This embodiment relates to a method for bearer control and data distribution. Specific network side entities involved herein are a BS, a gateway, an MBS proxy, and an MBS server. In this embodiment, the establishment of MBS service bearer and data distribution relation is triggered by a registration flow of a downstream node to an upstream node.

As shown in FIG. 2, in Step 201, the BS finds out that it needs to receive a certain MBS. The reason why the BS needs to receive the MBS may be as follows: a user terminal joins the MBS service under the BS, the user terminal that has joined the MBS moves from another BS to the current BS and accesses it so as to notify the BS through a handover flow, or it is found by periodic counting that the number of the user terminal receiving the MBS is not zero, or the like.

Next, in Step 202, if the BS has not registered with the upstream node to request to join the MBS, the BS sends a registration request to an upstream node thereof for joining the MBS. Specifically, the BS sends a registration request carrying identification information of the MBS to the gateway. The identification information of the MBS includes one of or any combination of an MBS ID, a contents ID, an IP multicast address corresponding to the MBS service, and an MBS zone ID.

After the gateway receives the registration request, if a downstream node list corresponding to the MBS maintained by the gateway does not have information of the node, information of the BS needs to be added to the list, or related nodes of the BS (for example, BSs supporting the MBS in the zone of the BS, all BSs managed by the gateway, or related nodes determined according to the configuration and its own decision for the MBS service) may be added to the list. This list may also already have information of the current node that may be pre-configured or caused by the registration of other nodes.

The gateway labels a distribution relation corresponding to the BS as "distributing". Or, the gateway may also label a distribution relation of related nodes of the BS (for example, all nodes in a corresponding zone in the list, all nodes in the list, or related nodes determined according to the configuration and its own decision) as "distributing". Here, the distribution relation may have already been labeled as "distributing" due to pre-configuration or registration of other nodes.

If the gateway has not registered the MBS with an upstream node thereof, at this point, the gateway also needs to register with the upstream node that may be the MBS server or the MBS proxy.

In the case that the upstream node thereof is the MBS server, the flow proceeds to Step 203 in which the gateway sends to the MBS server a registration request carrying the identification information of the MBS. The identification information of the MBS includes one of or any combination of an MBS ID, a contents ID, an IP multicast address corresponding to the MBS service, and an MBS zone ID. The registration request sent from the gateway to the MBS server may be forwarded to the MBS server via the MBS proxy or directly sent to the MBS server from the gateway.

After the MBS server receives the registration request, if a downstream node list corresponding to the MBS maintained by the MBS server does not have information of the node, information of the gateway node is added to the list, or related nodes corresponding to the gateway (for example, gateways supporting the MBS in the zone of the gateway, all gateways managed by the MBS server, or related nodes determined according to the configuration and its own decision for the MBS service) may be added to the list. This list may also already have information of the current node that may be pre-configured or caused by the registration of other nodes.

The MBS server labels a distribution relation corresponding to the gateway as "distributing". Or, the MBS server may also label a distribution relation of related nodes corresponding to the gateway (for example, all nodes in a corresponding zone in the list, all nodes in the list, or related nodes determined according to the configuration and its own decision) as "distributing". Here, the distribution relation may also have already been labeled as "distributing" due to pre-configuration or registration of other nodes.

In the case that the upstream node of the gateway is the MBS proxy, the flow proceeds to Step 204 in which the gateway sends to the MBS proxy a registration request carrying the identification information of the MBS. The identification information of the MBS includes one of or any combination of an MBS ID, a contents ID, an IP multicast address corresponding to the MBS service, and an MBS zone ID.

After the MBS proxy receives the registration request, if a downstream node list corresponding to the MBS maintained by the MBS proxy does not have information of the node, information of the gateway node is added to the list, or related nodes corresponding to the gateway (for example, gateways supporting the MBS in the zone of the gateway, all gateways managed by the MBS proxy, or related nodes determined according to the configuration and its own decision for the MBS service) may be added to the list. This list may also already have information of the current node that may be pre-configured or caused by the registration of other nodes.

The MBS proxy labels a distribution relation corresponding to the gateway as "distributing". Or, the MBS proxy may also label a distribution relation of related nodes corresponding to the gateway (for example, all nodes in a corresponding zone in the list, all nodes in the list, or related nodes determined according to the configuration and its own decision) as "distributing". Here, the distribution relation may also have already been labeled as "distributing" due to pre-configuration or registration of other nodes.

If the MBS proxy has not registered the MBS with an upstream node thereof, at this point, the MBS proxy also needs to register with the upstream node that is the MBS server, as in Step 205. The MBS proxy sends to the MBS server a registration request carrying the identification information of the MBS. The identification information of the MBS includes one of or any combination of an MBS ID, a contents ID, an IP multicast address corresponding to the MBS service, and an MBS zone ID.

After the MBS server receives the registration request, if a downstream node list corresponding to the MBS maintained by the MBS server does not have information of the node, information of the MBS proxy node is added to the list, or related nodes thereof (for example, all related MBS proxies of the MBS or related nodes determined according to the configuration and its own decision) may be all added to the list. This list may also already have information of the current node that may be pre-configured or caused by the registration of other nodes.

The MBS server labels a distribution relation corresponding to the MBS proxy as "distributing". Or, the MBS server may also label a distribution relation of related nodes thereof (for example, all nodes in a corresponding zone in the list or related nodes determined according to the configuration and its own decision) as "distributing". Here, the distribution relation may also have already been labeled as "distributing" due to pre-configuration or registration of other nodes.

The registration behaviors of the BS, the gateway, and the MBS proxy may be used as independent signaling flows or combined with other flows, for example, a flow in which a context is transferred when the user terminal joins the MBS or the user terminal moves.

The establishment of a bearer between the MBS server and a downstream node thereof is pre-configured and/or dynamically maintained, that is, the bearer between the MBS server and the downstream node thereof may be pre-configured or dynamically established. If no corresponding bearer exists after the MBS server completes the registration flow (Step 203, 204, or 205) with the downstream bearer node, the MBS server may temporarily not establish the bearer or immediately trigger the establishment of the bearer with the downstream bearer node thereof. The MBS server may only establish the bearer with the node initiating the registration flow, establish bearers with all downstream nodes thereof at the same time, or select to establish bearers with all downstream nodes in the same MBS zone as the node initiating the registration flow.

If the downstream bearer node of the MBS server is the gateway (i.e., the MBS proxy does not participate in the data plane transmission) and the MBS server owns information of the corresponding gateway, the MBS server sends an indication message of bearer establishment to the gateway, as in Step 206. The content of the indication message at least includes one of an MBS ID, a contents ID, an MCID, QoS information required by the service, an estimated duration of the service, related information of a bearer tunnel, an IP multicast address, information of a service classifier, physical layer parameters, an MBS GSA ID, an MBS security key, and an MBS security key context. Further, the MBS physical layer parameters at least include one of parameters of an MBS-MAP message and/or parameters of various service data blocks, a downlink interval usage code (DIUC), an LCID list, a sending time stamp and a sending period of the MBS-MAP message, a first sending time stamp and a sending period of each service data block, a location information indication of the MBS-MAP message, a location information indication of each service data block, and size limits and segmentation and packetization rules of a PDU, but are not limited thereto. After receiving the indication message, the gateway allocates corresponding bearer resources and returns a response message to the MBS server. The specific bearer mode between the MBS server and the gateway may be a tunnel or an IP multicast group mode. The bearer establishment process in Step 206 includes a process in which a tunnel between the MBS server and the gateway is established and a process in which the gateway joins an IP multicast group. Here, the bearer establishment process may be combined with the aforementioned bearer establishment indication/response process. Step 206 includes the bearer establishment indication, the bearer establishment response, and/or the bearer establishment process.

If the downstream bearer node of the MBS server is the gateway (i.e., the MBS proxy does not participate in the data plane transmission) and the MBS server does not have information of the corresponding gateway, the MBS server sends an indication message of bearer establishment to the MBS proxy through Step 207 when the gateway information is maintained by the MBS proxy. The content of the indication message is described above and will not be repeated herein again. The MBS proxy returns to the MBS server a response message that may include a list of gateways requiring to establish bearers. Step 207 includes the bearer establishment indication and the bearer establishment response. Meanwhile, the MBS proxy may forward the bearer establishment indication message to the gateway requiring to establish a bearer through Step 208 (Step 208 includes the bearer establishment indication and the bearer establishment response.). The establishment of the bearer between the gateway and the MBS server is achieved through Step 209 and may be triggered by the gateway or by the MBS server.

If the downstream bearer node of the MBS server is the MBS proxy (i.e., the MBS proxy participates in the data plane transmission), the MBS server establishes a bearer with the MBS proxy through Step 210. The process is consistent with the flow in which the MBS server establishes the bearer with the gateway in the aforementioned Step 206. Step 210 includes the bearer establishment indication, the bearer establishment response, and/or the bearer establishment process. The bearer between the MBS proxy and the gateway may be pre-configured or dynamically established. If no corresponding bearer exists between the MBS proxy and the gateway at this point, the MBS proxy may temporarily not establish the bearer or establish the bearer with the gateway through Step 211. The bearer establishment process is consistent with the flow in which the MBS server establishes the bearer with the gateway in the aforementioned Step 206. The MBS proxy may only establish a bearer with the gateway initiating the registration flow or establish bearers with all gateways belonging to the same MBS zone as the gateway. Step 211 includes the bearer establishment indication, the bearer establishment response, and/or the bearer establishment process.

The bearer between the gateway and the BS may be pre-configured or dynamically established. If no corresponding bearer exists between the gateway and the BS at this point, the gateway may temporarily not establish the bearer or establish the bearer with the BS through Step 212. The gateway may only establish a bearer with the BS initiating the registration flow or establish bearers with all BSs belonging to the same MBS zone as the BS. The gateway sends to the BS a message indicating to establish the corresponding bearer so as to notify the establishment of the bearer. The content of the indication message is described above and will not be repeated herein again, so that the downstream node can establish the corresponding bearer successfully. The BS receives the message indicating to establish the corresponding bearer from the gateway, then establishes the corresponding bearer, and returns a response message to the gateway. A bearer on an R6 interface between the gateway and the BS may be established through the existing resource reservation (RR) flow and data path flow.

Next, in Step 213, the BS further allocates air interface service resources after the network side bearer is established. At this point, the establishment of the air interface resources is involved. If the BS supports a point-to-point (PTP) mode and a point-to-multipoint (PTM) mode at the same time, the BS needs to decide the PTP/PTM transmission mode once.

Till now, the data bearer is established, the MBS server delivers service data, and the MBS nodes distribute data according to the established bearers and distribution relations corresponding to the bearers.

It should be noted that, in this embodiment, after receiving the registration request carrying the identification information of the MBS, the upstream node may also establish bearers with related nodes in a downstream node list. The related nodes in the downstream node list are downstream nodes located in the same MBS zone as the downstream node initiating the registration request in a downstream node list corresponding to the MBS maintained by the upstream node, all downstream nodes in the downstream node list, or downstream nodes determined according to the configuration and its own decision. If the downstream node sends to the upstream node a message indicating that the downstream node prepares to receive the MBS service data (for example, a registration message carrying the identification information of the MBS), the upstream node adds the downstream node and/or related nodes outside the downstream node list to the downstream node list maintained by the upstream node. The related nodes outside the downstream node list are downstream nodes located in the same MBS zone as the downstream node in a management range of the upstream node for the MBS service, or all downstream nodes in the management range of the upstream node, or related nodes determined by the upstream node according to the configuration and its own decision for the MBS service.

This embodiment provides a specific flow for the establishment of the MBS bearer, so that MBS data can be received successfully.

A second embodiment of the present invention relates to a method for bearer control and data distribution. In this embodiment, the establishment of a bearer between MBS nodes is triggered by the MBS server at the start of an MBS service session.

This embodiment is introduced in detail below with reference to the drawings. This embodiment relates to the method for bearer control and data distribution. Specific network side entities involved herein are a BS, a gateway, an MBS proxy, and an MBS server.

Figure 3:
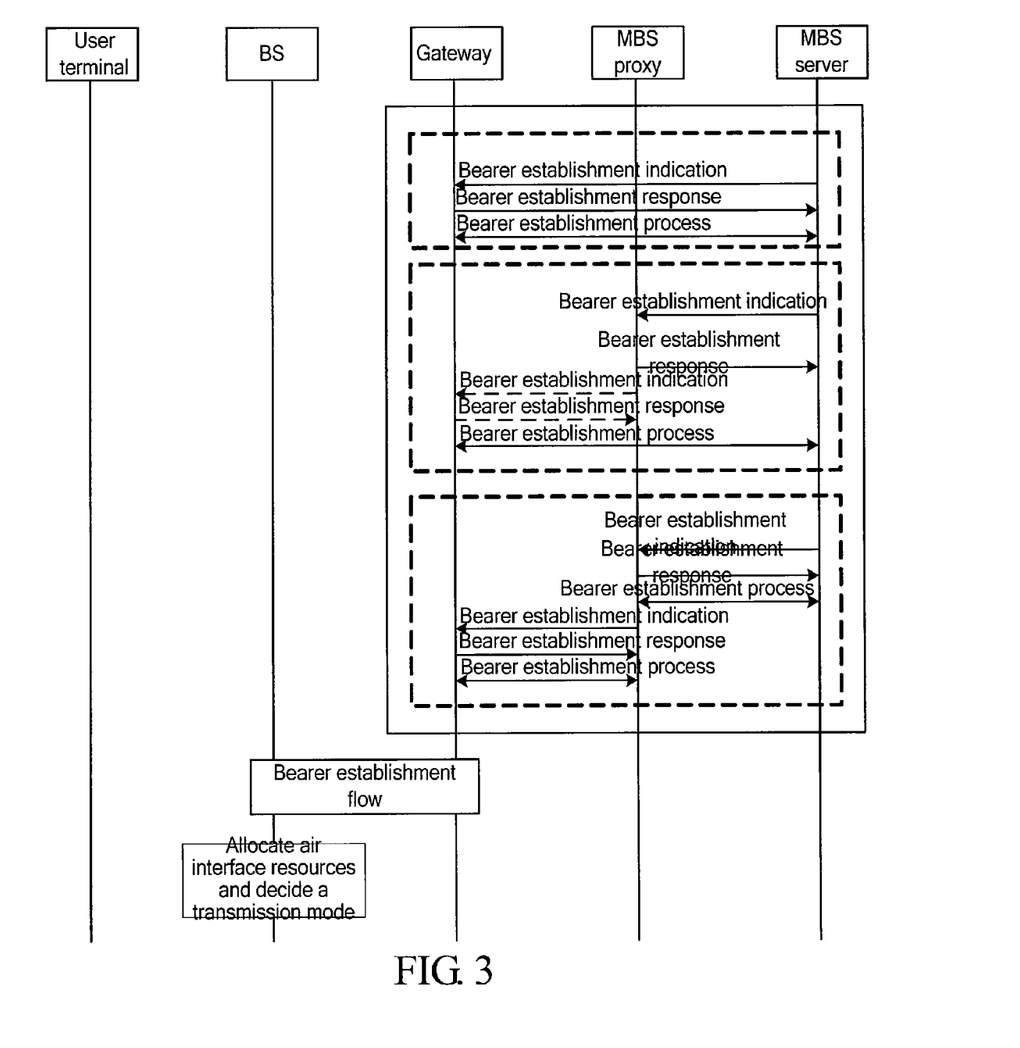
FIG. 3 is a flow chart of a method for bearer control and data distribution according to a second embodiment of the present invention.

In this embodiment, the bearer establishment process is approximately the same as that in the first embodiment, and the difference lies in different triggering conditions of bearer establishment. In the first embodiment, the bearer establishment is triggered by the registration flow of the downstream node, while in this embodiment, the bearer establishment is triggered by the MBS server at a specific point in time. As shown in FIG. 3, when an MBS session is about to start and before service data of the MBS is transmitted, the MBS server sends to a downstream node of the MBS a message indicating to establish a corresponding bearer so as to notify the node that the session starts and the bearer needs to be established. The content of the message is described above and will not be repeated herein again.

In this embodiment, the process of establishing the network side bearer is approximately the same as that in the first embodiment. The bearer between the MBS nodes is established according to pre-configured or dynamically maintained service distribution information. After the bearer is established, the MBS service data is distributed according to the bearer and a corresponding distribution relation thereof. The maintenance mechanism of the service distribution information and the data distribution relation is similar to that in the first embodiment and will not be described herein again.

Seen from the above, this embodiment also enables the MBS data to be received successfully.

A third embodiment of the present invention relates to a method for bearer control and data distribution. In this embodiment, the related bearer and data distribution relation is established through configuration without being triggered by signaling. That is, the bearers between MBS nodes are all established through pre-configuration, and the data distribution relations are all configured in the pre-configuration phase without being triggered by signaling for creation or updating. The service data is distributed in configured areas.

Seen from the above, this embodiment also enables the MBS data to be received successfully.

As a reverse process of the establishment process, the release of the MBS service bearer may be implemented in three manners according to triggering conditions.

Firstly, in a WiMAX network, when a certain condition is satisfied (for example, the sending of the service data comes to a conclusion), an upstream node needs to notify a downstream node to remove a corresponding data bearer through signaling exchange, so as to save system resources. This process may occur at the end of an MBS session. At this point, the MBS server notifies, according to a list of downstream bearer nodes (access network gateways or MBS proxies) receiving the MBS maintained on the MBS server, an access network gateway receiving the MBS to remove the data bearer. The notification manner varies with the bearer mode. The access network gateway or the MBS proxy notifies, according to a list of downstream bearer nodes (BSs or gateways) receiving the MBS maintained on the access network gateway or the MBS proxy, an BS or gateway to remove the corresponding bearer. According to the received notification, the BS respectively employs different connection release strategies to stop sending data and release air interface bandwidth resources occupied by the MBS based on different transmission modes of the PTP and PTM modes.

Secondly, when a certain node does not need to receive the MBS service, the node notifies the network side not to send the service data to the node any more for saving the air interface bandwidth resources and/or network bearer resources, which is implemented in a manner of removing the previously established data bearer of the MBS or maintaining the bearer but not sending data thereto. The bearer release manner varies with the bearer mode. When the BS needs to release the bearer resources, the BS has to respectively employ different connection release strategies to stop sending data and release air interface bandwidth resources occupied by the MBS based on different transmission modes of the PTP and PTM modes. The reason why the BS and/or the access network gateway does not need to receive the MBS may be as follows: the user terminal performs a leave operation under the BS or moves to another BS when receiving the MBS, the user terminal is kicked out of the group of the receiving users by the network side for some reason, or it is found by periodic counting that the number of the user terminals or downstream nodes receiving the MBS is zero, or the like.

Thirdly, the release of the bearer resources is realized through configuration, and similar to the third manner of establishment, the release is also achieved through configuration without signaling exchange.

Figure 4:
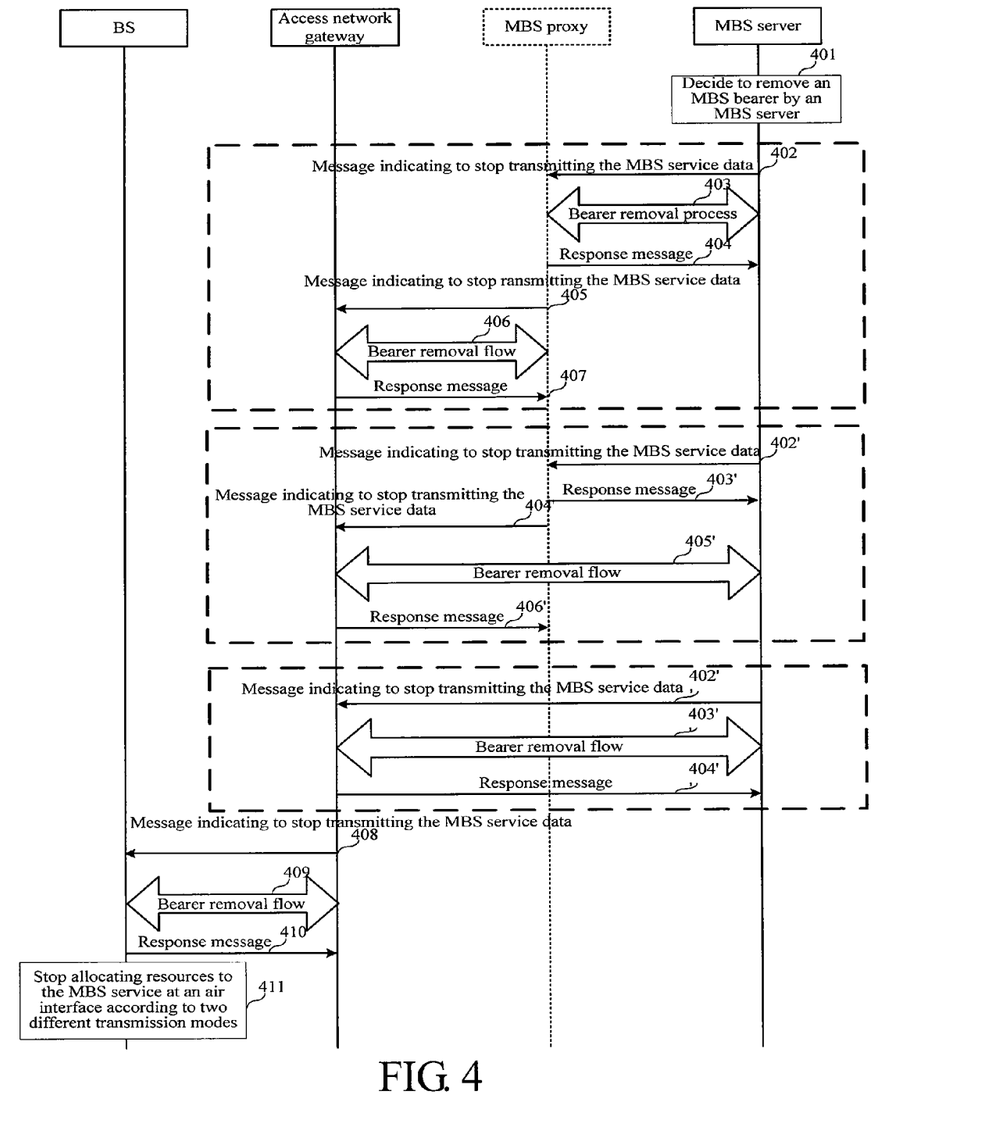
FIG. 4 is a flow chart of a method for bearer deletion according to a fourth embodiment of the present invention.

A fourth embodiment of the present invention is illustrated in detail below. This embodiment relates to a method for bearer deletion, and a specific flow thereof is shown in FIG. 4. In this embodiment, the network side needs to remove a corresponding bearer due to the end of an MBS session.

In Step 401, an MBS server determines to remove an MBS bearer. Specifically, when the MBS session stops, the MBS needs to initiate a flow of removing the MBS bearer at the network side for saving the network bearer resources.

When a downstream bearer node of the MBS server is an MBS proxy (i.e., the MBS proxy participates in the data plane transmission), the flow proceeds to Steps 402 to 407. When a downstream bearer node of the MBS server is a gateway (i.e., the MBS proxy does not participate in the data plane transmission) and the MBS server does not have information of the corresponding gateway, the flow proceeds to Steps 402' to 406'. When a downstream bearer node of the MBS server is a gateway (i.e., the MBS proxy does not participate in the data plane transmission) and the MBS server owns information of the corresponding gateway, the flow proceeds to Steps 402" to 404". The three cases are respectively illustrated below.

When the downstream bearer node of the MBS server is the MBS proxy (i.e., the MBS proxy participates in the data plane transmission), the flow proceeds to Step 402. In this step, the MBS server sends, according to a list of MBS proxies receiving the MBS maintained on the MBS server, a message indicating to stop transmitting service data of the MBS to the node to all MBS proxies that have established bearers in the list via a signaling path, so as to notify the MBS proxy receiving the MBS that the session has ended and the bearer needs to be released. The message carries identification information of the MBS.

As the MBS service between the MBS server and the MBS proxy is transmitted in two modes: one is a tunnel mode in which the signaling and the service are sent via different tunnels, and the other is an IP multicast mode in which the signaling and the service are sent and received via different IP addresses. For a specific MBS, the MBS server maintains information of one IP multicast group.

Therefore, the identification information of the MBS carried in the message sent from the MBS server to the downstream node may include a data path ID or an IP multicast address of the MBS, or further include an MBS ID and/or an MBS contents ID or other information capable of identifying the MBS, so that the MBS proxy receiving the message may successfully find the MBS bearer required to be removed.

Next, in Step 403, after receiving the message, the MBS proxy starts to delete the data bearer of the MBS with the MBS server according to the identification information of the MBS carried in the message. If the data bearer is established by using a data path, the MBS proxy removes the bearer according to a data path release flow, and if the data bearer is established by using an IP multicast group, the MBS proxy exits the corresponding IP multicast group.

After receiving the message sent from the MBS server and performing the deletion operation of the MBS bearer, the MBS proxy needs to return to the MBS server a response message carrying a processing result and/or the identification information of the MBS, as in Step 404.

Afterward, in Step 405, the MBS proxy sends, according to a list of gateways receiving the MBS maintained on the MBS proxy, the message indicating to stop transmitting the MBS service data to the node to all gateways that have established bearers in the list via a signaling path, so as to notify the gateway receiving the MBS that the session has ended and the bearer needs to be released. The message carries the identification information of the MBS.

As the MBS service between the MBS proxy and the gateway is also transmitted in two modes: one is a tunnel mode and the other is an IP multicast mode. Therefore, the identification information of the MBS carried in the message indicating to stop transmitting the MBS service data to the node sent from the MBS proxy to the downstream gateway node may include a data path ID or an IP multicast address of the MBS, or further include an MBS ID, a contents ID, an SFID, a CID, an MCID and an LCID, a data path ID, an IP multicast address, an authorization token and an MBS zone ID, a flow ID and an SFID, or other information capable of identifying the MBS, so that the gateway receiving the message may successfully find the MBS bearer required to be removed.

In Step 406, after receiving the message, the gateway starts to delete the data bearer of the MBS with the MBS proxy according to the identification information of the MBS carried in the message. If the data bearer is established by using a data path, the gateway removes the bearer according to a data path release flow, and if the data bearer is established by using an IP multicast group, the gateway exits the corresponding multicast group.

After receiving the message sent from the MBS proxy and performing the deletion operation of the MBS bearer, the gateway needs to return to the MBS proxy a response message carrying a processing result and/or the identification information of the MBS, as in Step 407.

If the downstream bearer node of the MBS server is the gateway (i.e., the MBS proxy does not participate in the data plane transmission) and the MBS server does not have information of the corresponding gateway, the flow proceeds to Steps 402' to 406'. The MBS server sends, according to an MBS proxy list maintained by the MBS server, a message indicating to stop transmitting the MBS service data to the node to the MBS proxy via a signaling path, so as to notify the gateway receiving the MBS that the session has ended, as in Step 402'. The message carries identification information of the MBS. The carried identification information of the MBS may include a data path ID or an IP multicast address of the MBS, an MBS ID and/or an MBS contents ID, an SFID, an MCID, an MBS zone ID, or other information capable of identifying the MBS. The MBS proxy returns the gateway list maintained thereby to the MBS server through a response message, as in Step 403'. Meanwhile, the MBS proxy sends the message indicating to stop transmitting the MBS service data to the node to a gateway requiring to release the bearer, as in Step 404'. In Step 405', the gateway receiving the message deletes the data bearer of the MBS with the MBS server, which is similar to Step 405 and will not be described herein again. The gateway returns a response message carrying result information to the MBS proxy through Step 406'. The MBS proxy maintains a downstream node list thereof according to this message.

When the downstream bearer node of the MBS server is the gateway (i.e., the MBS proxy does not participate in the data plane transmission) and the MBS server owns information of the corresponding gateway, the flow proceeds to Steps 402" to 404". The MBS server directly sends, according to a list of gateways receiving the MBS maintained on the MBS server, a message indicating to stop transmitting service data of the MBS to the node to all gateways that have established bearers in the list via a signaling path, so as to notify the gateway receiving the MBS that the session has ended and the bearer needs to be released. The message carries identification information of the MBS. The carried identification information of the MBS may include a data path ID or an IP multicast address of the MBS, an MBS ID and/or an MBS contents ID, an SFID, an MCID, an MBS zone ID, or other information capable of identifying the MBS. In Steps 403" and 404", the gateway receiving the message deletes the data bearer of the MBS with the MBS server, which are similar to Steps 406 and 407 and will not be described herein again.

In Step 408, the gateway sends, according to a list of BSs receiving the MBS maintained on the gateway, the message indicating to stop transmitting service data of the MBS to the node to all BSs in the list via a signaling path, so as to notify the BS receiving the MBS that the session has ended and the bearer needs to be released. The message carries identification information of the MBS. The identification information of the MBS may include one of or any combination of the following parameters: a data path ID of the MBS, a contents ID, an SFID, an MBS ID, an MCID and an LCID, an MBS zone ID, and an IP multicast address of the MBS, so that the BS receiving the message may successfully find the MBS bearer required to be removed.

Next, in Step 409, the BS removes the data path designated in the message according to the identification information of the MBS in the message after receiving the message sent from the gateway. The BS may stop sending data of the MBS according to the MBS contents ID and/or the MBS ID designated in the message or select to stop sending the data of the MBS after completing the sending of the MBS data currently buffered in the BS.

Afterward, in Step 410, the BS returns to the gateway a response message carrying a processing result and/or the MBS ID.

Then, in Step 411, the BS releases corresponding air interface bandwidth resources according to the transmission mode of the MBS.

Specifically, if the MBS data currently sent by the BS is in the PTM mode, a corresponding MCID and LCID is searched for according to the MBS ID and/or the MBS contents ID. The BS cancels the allocation of air interface bandwidth resources for the MCID and the corresponding LCID, for example, cancels the allocation of air interface resources for the MCID and the corresponding LCID in "MBS_MAP_IE", "MBS_DATA_IE", and/or "EXTEND_MBS_DATA_IE". If the MBS data currently sent by the BS is in the PTP mode, a corresponding CID is searched for according to the MBS ID and/or contents of the MBS, and the allocation of air interface bandwidth resources for the CID is stopped.

Seen from the above, in this embodiment, when the MBS session ends, bearer resources may be saved to a certain extent and meanwhile the MBS session can be effectively managed by removing related bearers of the MBS within the network side.

Figure 5:
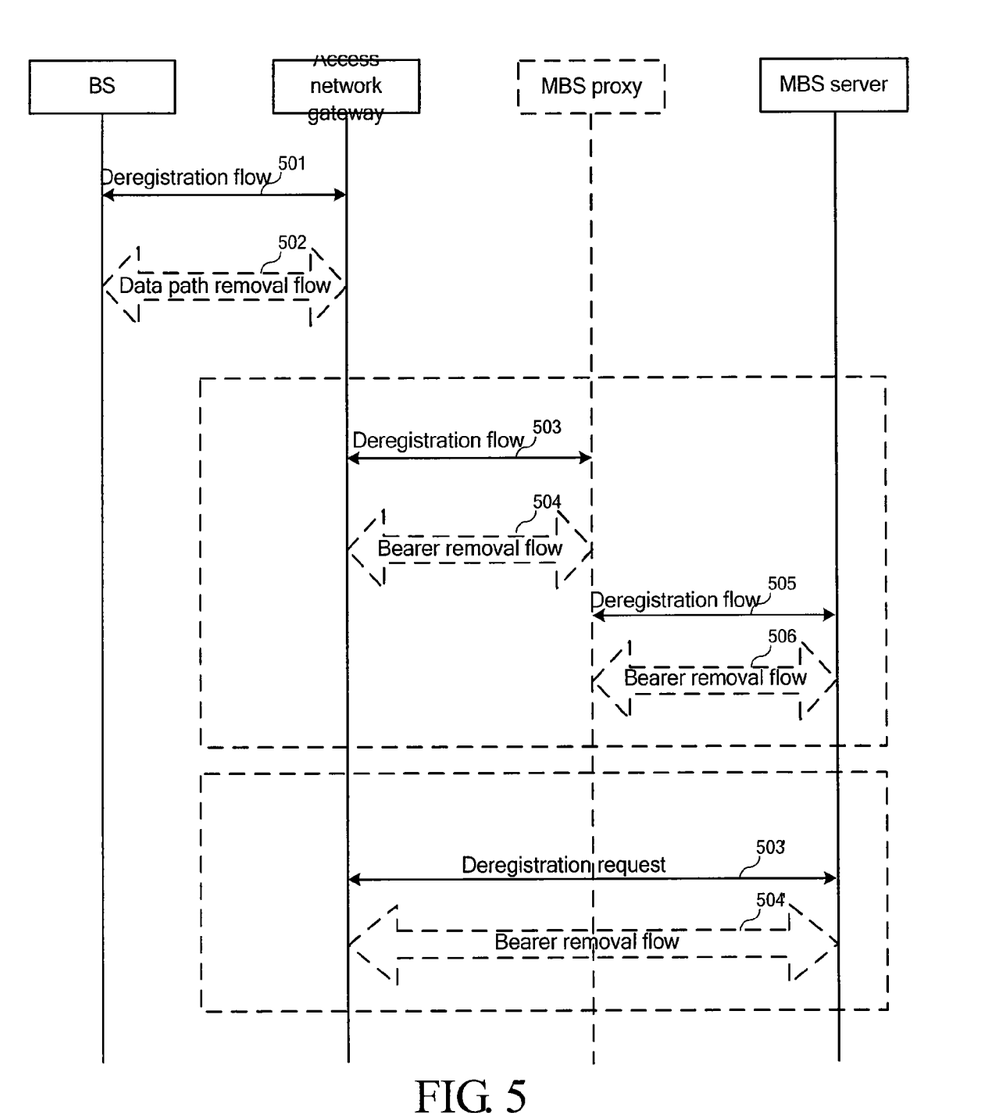
FIG. 5 is a flow chart of a method for bearer deletion and data distribution according to a fifth embodiment of the present invention.

A fifth embodiment of the present invention relates to a method for bearer deletion and data distribution, and a specific flow thereof is shown in FIG. 5. In this embodiment, as the BS does not need to continue receiving the MBS, the BS notifies an upstream node to stop distributing the service data to the BS.

In Step 501, when no user terminal under the BS receives the MBS, the BS is required to stop sending the MBS for saving network bearer resources and air interface bandwidth. The reason why the BS does not need to receive the MBS may be as follows: the user terminal receiving the MBS performs a leave operation under the BS or moves to another BS and accesses it when receiving the MBS so as to notify the BS through a handover acknowledgement message, the user terminal is kicked out of the group of the receiving users by the network side for some reason, or it is found by periodic counting that the number of user terminals receiving the MBS is zero, the BS's own decision, or the like.

When the BS does not need to receive the MBS, the BS needs to send to an upstream node, i.e., the access network gateway, a message indicating to stop transmitting service data of the MBS to the node, so that the access network gateway can stop distributing data to the node and remove the corresponding bearer when necessary, thereby enabling the MBS session to be managed effectively. The message carries identification information of the MBS. The message is a deregistration request message or a message requesting to release a bearer channel. The identification information of the MBS includes one of or any combination of the following parameters: an MBS ID, a contents ID, an SFID, a CID, an MCID and an LCID, a data path ID and an IP multicast address, and an MBS zone ID.

Specifically, if the BS has received and transported the MBS before, that is, a bearer of the MBS between the BS and the gateway has already been established, the gateway has labeled that data is distributed to the BS, and the BS has allocated air interface resources for the MBS, the BS may release the allocation of the air interface bandwidth resources for the MBS and require to perform a flow of releasing a data path established for the MBS, or the BS initiates a deregistration request to the access network gateway to notify the gateway that the BS no longer needs to receive the MBS after completing the release of the air interface bandwidth resources for the MBS. If the BS only joins the MBS but has not received the MBS (for example, a session of the MBS has not started), that is, the BS has not established bearer resources with the access network gateway before, the BS does not need to perform the step of releasing the air interface resources of the MBS, and instead initiates a deregistration request to the access network gateway to notify the gateway that the BS no longer needs to receive the MBS. The deregistration request message or the message requesting to release the bearer channel sent from the BS to the gateway may carry an MBS ID, an MBS contents ID and/or an IP multicast address, an SFID, an MCID, an MBS zone ID, or other information capable of identifying the MBS, for example, bearer identification information of the MBS, so that the gateway receiving the message may successfully find the corresponding MBS.

Then, in Step 502, if the access network gateway receives the message requesting to release the bearer channel, the access network gateway finds the corresponding MBS according to the data path ID in the message, and thus finds a list of BSs receiving the MBS and deletes information of the BS from the list. If the access network gateway receives the deregistration request message, the access network gateway finds a corresponding list of BSs receiving the MBS according to the identification information of the MBS in the deregistration request, deletes information of the BS from the list or labels a data distribution relation corresponding to the BS as "not distributing", and finds the corresponding data path information according to the identification information of the MBS. If bearer resources of the MBS with the BS have been established, bearer resource release flow of the MBS can be performed.

If the list of BSs receiving the MBS maintained within the gateway already has no BS requiring to receive the service, the gateway initiates a deregistration request to the MBS proxy or the MBS server.

When the upstream bearer node of the gateway is the MBS proxy, the flow proceeds to Steps 503 to 506, and when the upstream bearer node of the gateway is the MBS server, the flow proceeds to Steps 503' to 504'. The two cases are respectively illustrated below.

When the upstream bearer node of the gateway is the MBS proxy, the flow proceeds to Step 503 in which the gateway initiates a deregistration request to the MBS proxy. The deregistration request carries an MBS ID, an MBS contents ID and/or an IP multicast address, an SFID, an MCID, an MBS zone ID, or other information capable of identifying the MBS, so that the MBS proxy receiving the message may successfully find the corresponding MBS service.

Next, in Step 504, the MBS proxy updates a list of gateways receiving the MBS, i.e., deletes information of the gateway from the list or labels a data distribution relation corresponding to the gateway as "not distributing". If bearer resources between the MBS proxy and the gateway have been established, a bearer resource release flow is performed. If the bearer resources are data path resources, a data path release flow is performed. If the bearer resources are resources of an IP multicast group, the gateway is deleted from the IP multicast group and exits the IP multicast group. It is ensured that the data of the MBS is no longer sent to a downstream node not requiring to receive the data thereafter, so that the MBS session can be managed effectively.

If the list of gateways receiving the MBS service maintained in the MBS proxy already has no gateway requiring to receive the service, the flow proceeds to Step 505 in which the MBS proxy initiates a deregistration request to the MBS server. The deregistration request carries an MBS ID, an MBS contents ID and/or an IP multicast address, an SFID, an MCID, an MBS zone ID, or other information capable of identifying the MBS, so that the MBS server receiving the message may successfully find the corresponding MBS service.

Then, in Step 506, the MBS server updates a list of MBS proxies receiving the MBS, i.e., deletes the MBS proxy from the list or labels a data distribution relation corresponding to the MBS proxy as "not distributing". If bearer resources between the MBS proxy and the MBS server have been established, a bearer resource release flow is performed. If the bearer resources are data path resources, a data path release flow is performed. If the bearer resources are resources of an IP multicast group, the proxy is deleted from the IP multicast group and exits the IP multicast group. It is ensured that the data of the MBS is no longer sent to a downstream node not requiring to receive the data thereafter, so that the MBS session can be managed effectively.

When the upstream bearer node of the gateway is the MBS server, the flow proceeds to Step 503' in which the gateway initiates a deregistration request to the MBS server. The deregistration request may be sent directly from the gateway to the MBS server or forwarded by the MBS proxy to the MBS server. The deregistration request carries an MBS ID, an MBS contents ID and/or an IP multicast address, an SFID, an MCID, an MBS zone ID, or other information capable of identifying the MBS, so that the MBS server receiving the message may successfully find the corresponding MBS service.

Afterward, in Step 504', the MBS server updates a list of gateways receiving the MBS, i.e., deletes the gateway from the list or labels a data distribution relation corresponding to the gateway as "not distributing". If bearer resources between the gateway and the MBS server have been established, a bearer resource release flow is performed. If the bearer resources are data path resources, a data path release flow is performed. If the bearer resources are resources of an IP multicast group, the gateway is deleted from the IP multicast group and exits the IP multicast group. It is ensured that the data of the MBS is no longer sent to a downstream node not requiring to receive the data thereafter, so that the MBS session can be managed effectively.

A sixth embodiment of the present invention relates to a method for bearer deletion and data distribution. In this embodiment, the release of bearers between various MBS nodes and the maintenance of distribution relations employ a configuration manner as in the establishment, the release or updating thereof are not triggered by signaling, and have nothing to do with the fact whether a user for reception exists or not. The specific configuration behaviors will not be described herein again.

Figure 6:
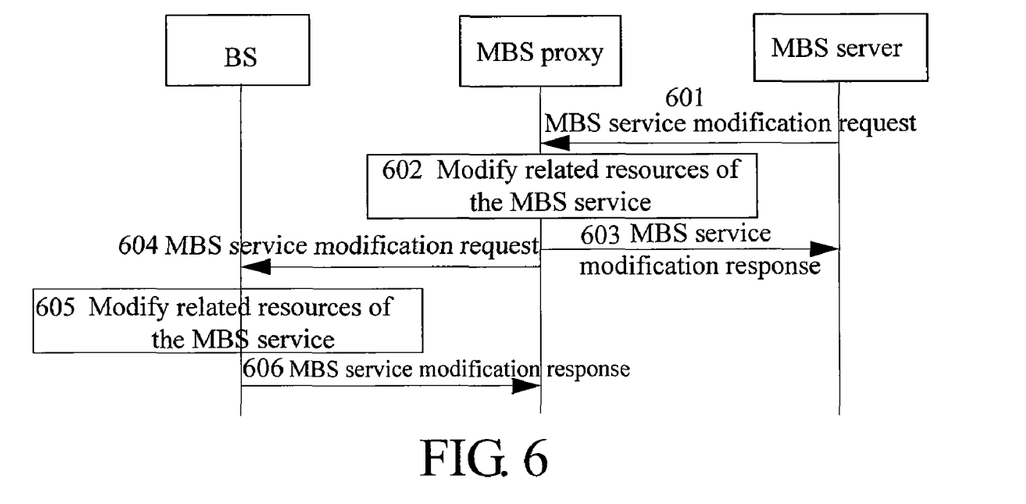
FIG. 6 is a flow chart of a method for MBS modification according to a seventh embodiment of the present invention.

A seventh embodiment of the present invention relates to a method for MBS modification in a communication system adapted to modify an MBS service at a network side, and a specific flow thereof is shown in FIG. 6. In this embodiment, an upstream node includes an MBS server, an MBS proxy, and/or a gateway, and a downstream node includes an MBS proxy, a gateway, and/or a BS. A triggering condition for modifying the MBS service is as follows: the MBS server modifies resources stored and reserved for the MBS service.

For convenience of description, in this embodiment, for example, the upstream node is an MBS server, and the downstream node is an MBS proxy. The flow specifically includes the following steps.

In Step 601, the MBS server sends to the MBS proxy a modification request for modifying the MBS service.

The MBS proxy is used as a central node at the side of an access service network (ASN) of the MBS service for controlling and forwarding MBS programs from the MBS server or a content provider. The MBS proxy may be disposed in an ASN zone, on an ASN GW, or bound with a service flow authorization (SFA) module (a QoS network element of the Wimax located on the ASN GW), or exist in the network as an independent functional unit.

The MBS service modification request includes an MBS service ID for identifying the MBS service, and may further include a resource required to be modified. For example, the resource required to be modified is a QoS parameter or an MBS contents ID. The MBS service ID at least includes one of an MBS contents ID, a multicast IP address/port number, a flow ID, an SFID, an MCID, an authorization token, and an MBS zone ID. The resource required to be modified at least includes one of a QoS parameter, an MBS contents ID, a physical layer parameter, an MBS zone ID, an MBS GSA ID, an SFID, an MCID, a flow ID, an MBS security key, and an MBS security key context.

In Step 602, after receiving the request for modifying the MBS service, the MBS proxy modifies resources stored and reserved for the MBS service. For example, when the resource required to be modified received by the MBS proxy is a QoS parameter or an MBS contents ID, the MBS proxy reconfigures the resource according to the requirement of the QoS parameter (the configuration of the resource may include configuration of bearer or tunnel resources). When the resource to be modified received by the MBS proxy is an MBS contents ID, the MBS proxy updates the MBS contents ID.

The downstream node (for example, the MBS proxy) modifies resources stored and reserved for the MBS service according to the service modification request. The resources include a data path within the ASN, and/or a tunnel between the ASN and the MBS server, and/or service flow parameters, physical layer parameters, and/or multicast security keys stored for the MBS service on the MBS server and various network elements within the ASN.

In addition, when the network side modifies configuration resources of the MBS service, the MBS proxy or the MBS server sends to the BS a service modification request carrying MBS physical layer parameters, indicating the BS to reconfigure an MBS-MAP message. The MBS physical layer parameters include parameters of the modified MBS-MAP message and/or parameters of various service data blocks.

Further, the MBS physical layer parameters at least include one of a DIUC, an MCID, an LCID list, a sending time stamp and a sending period of the modified MBS-MAP message, a first sending time stamp and a sending period of each service data block, a location information indication of the modified MBS-MAP message, a location information indication of each service data block, and size limits and segmentation and packetization rules of a PDU.

In Step 603, the MBS proxy returns a modification result to the MBS server. The modification result includes an MBS service ID and a processing result about whether the modification is successful or not.

When a tunnel exists between the MBS server and the MBS proxy, a modification process of the tunnel is performed.

In Step 604, the MBS sends an MBS service modification request to the gateway or the BS or to the BS via the gateway (in this embodiment, for example, the request is sent directly to the BS). The request includes an MBS service ID and a resource of the MBS service required to be modified. The MBS service ID at least includes one of an MBS contents ID, a multicast IP address/port number, a flow ID, an SFID, an MCID, an authorization token, and an MBS zone ID. The resource required to be modified at least includes one of a QoS parameter, an MBS contents ID, a physical layer parameter, an MBS zone ID, an MBS GSA ID, an SFID, an MCID, a flow ID, an MBS security key, and an MBS security key context.

In Step 605, the BS receives the MBS service modification request to modify related resources in the corresponding MBS service modification request. For example, when the resource required to be modified received by the BS is a QoS parameter, the BS reconfigures the resource according to the requirement of the QoS parameter (the configuration may include configuration of bearer or tunnel resources). When the resource to be modified received by the BS is an MBS contents ID, the BS updates the MBS contents ID.

In Step 606, the BS returns a service modification response or a processing result to the MBS proxy. The service modification response or the processing result includes an MBS service ID and a processing result about whether the modification is successful or not.

When a tunnel exists between the BS and the MBS proxy, a modification process of the tunnel is performed.

The purpose of modifying the MBS service resources at the network side is realized through the above process.

The above process may also be performed independently between the MBS server and the MBS proxy or between the MBS proxy and the BS. For example, if the MBS proxy needs to adjust MBS_MAP messages sent by various BSs, the MBS service modification request includes modifying a certain parameter of a physical layer (for example, a sending time and/or a sending period corresponding to the next MBS_MAP message and/or the next MBS service data block, including location indications of a symbol offset and a sub-channel offset, a power indication, a repetitive coding indication, or a DIUC). Upon reception, the BS reconfigures the MBS_MAP message according to the indications and sends the message at an air interface at a designated time.

Preferably, the MBS service modification request or the MBS service modification response in this embodiment may be respectively independent messages or borne in the same message and distinguished by modification indications.

An eighth embodiment of the present invention relates to a network node including: a module adapted to store MBS distribution information including a downstream node list corresponding to the MBS; a module adapted to establish and maintain a service bearer and a data distribution relation corresponding to the MBS based on the MBS service distribution information; and a module adapted to distribute service data of the MBS according to the service bearer and the data distribution relation. The establishment of the service bearer and the data distribution relation corresponding to the MBS will be specifically illustrated in a ninth embodiment.

The ninth embodiment of the present invention relates to a system for bearer control and data distribution including at least two network nodes mentioned in the eighth embodiment that are respectively an upstream node and a downstream node of each other.

The downstream node establishes a service bearer and a data distribution relation corresponding to an MBS by including: a module adapted to send to the upstream node a registration request carrying identification information of the MBS, indicating that the downstream node desires to receive data of the MBS and requests to join the MBS; and/or a module adapted to establish a corresponding bearer with the upstream node after receiving a message indicating to establish a bearer of the MBS. The identification information of the MBS includes an MBS ID, a contents ID, and/or an IP multicast address.

The upstream node establishes a service bearer and a data distribution relation corresponding to the MBS by including: a module adapted to send to the downstream node a message indicating to establish the bearer of the MBS that carries the identification information of the MBS and may include one of or any combination of the following parameters: an MBS ID, a contents ID, an MCID, a QoS message required by the MBS, an estimated duration of the MBS, related information of a bearer tunnel and an IP multicast address, information of a classifier corresponding to the service, physical layer parameters, an MBS GSA ID, an MBS security key, and an MBS security key context; and/or a module adapted to at least have one of the following functions after receiving the registration request message carrying the identification information of the MBS from the downstream node: adding the downstream node and/or related nodes outside a downstream node list to a list of downstream nodes receiving the MBS; and updating a distribution relation corresponding to the downstream node and/or related nodes in the downstream node list and labeling it as distributing data to the downstream node and/or the related nodes.

The related nodes outside the downstream node list are downstream nodes located in the same MBS zone as the downstream node in a management range of the upstream node for the same MBS service or all downstream nodes in a management range of the upstream node for the same MBS service. The related nodes in the downstream node list are downstream nodes located in the same MBS zone as the downstream node initiating the registration request in a downstream node list corresponding to the MBS maintained by the upstream node or all downstream nodes in the downstream node list.

When an MBS session starts, the upstream node sends to all downstream nodes requiring to receive the MBS bearer the message indicating to establish the bearer of the MBS corresponding to the identification information of the MBS, and after receiving the message, the downstream node establishes a corresponding bearer. When requiring to receive the MBS, the downstream node sends to the upstream node thereof a registration request message carrying the identification information of the MBS, and after receiving the message, the upstream node prepares to distribute data to the downstream node. The upstream node may establish the corresponding bearer immediately, or not establish the bearer temporarily but add the node to the list of nodes requiring to receive the service and/or label a distribution relation corresponding to the node as "distributing" and establish the corresponding bearer and distribute the service data when necessary, so that the MBS session can be managed effectively.

The downstream node may be a BS, a gateway, and/or an MBS proxy, and the upstream node may be a gateway, an MBS proxy, and/or an MBS server. It is ensured that the network side can establish the MBS bearer and distribution relation successfully, and thus the user terminal can receive the MBS data successfully.

The ninth embodiment of the present invention relates to a system for bearer deletion and data distribution including an upstream node and a downstream node.

The upstream node at least includes one of the following modules.

A module is adapted to send to the downstream node a message indicating to stop transmitting MBS service data to the downstream node carrying identification information of the MBS.

A module is adapted to delete a bearer of the MBS corresponding to identification information of the MBS carried in the message with the downstream node after receiving from the downstream node the message indicating to stop transmitting the MBS service data to the downstream node. The module may delete the bearer by releasing the data path or deleting the downstream node from a corresponding IP multicast group, thereby ensuring that data of the MBS is no longer sent to the downstream node not requiring to receive the service thereafter, so that the MBS session can be managed effectively. The identification information of the MBS includes one of or any combination of the following parameters: an MBS ID, a contents ID, a CID, an MCID, an LCID, a data path ID, and an IP multicast address.

A module is adapted to delete the downstream node from a list of downstream nodes receiving the MBS after receiving the message indicating to stop transmitting the MBS service data to the downstream node sent from the downstream node.

A module is adapted to label a distribution relation corresponding to the downstream node as "not distributing" after receiving the message indicating to stop transmitting the MBS service data to the downstream node sent from the downstream node.

The downstream node includes: a module adapted to send to the upstream node a message indicating to stop transmitting the MBS service data to the downstream node carrying the identification information of the MBS; and/or a module adapted to delete a bearer of the MBS corresponding to the identification information of the MBS carried in the message with the upstream node after receiving the message indicating to stop transmitting the MBS service data to the downstream node from the upstream node. The identification information of the MBS includes one of or any combination of the following parameters: an MBS ID, a contents ID, an SFID, a CID, an MCID and an LCID, a data path ID, and an IP multicast address.

When the MBS ends, the upstream node sends to all downstream nodes establishing the MBS bearer with the upstream node the message for stopping transmitting the MBS service data to the node, and after receiving the message, the downstream node deletes the corresponding bearer. When the downstream node does not need to receive the MBS, the downstream node sends to an upstream node thereof a message indicating to stop transmitting service data of the MBS to the downstream node. After receiving the message, the upstream node stops distributing data to the downstream node and may delete a corresponding bearer or maintain the bearer but label a distribution relation corresponding to the node as "not distributing" and not deliver the service data, so that the MBS session can be managed effectively. The downstream node may be a BS, a gateway, or an MBS proxy. The upstream node may be a gateway, an MBS proxy, and/or an MBS server.

In the embodiments of the present invention, for a certain MBS service, the MBS service distribution information is stored in at least one node of the MBS and consists of information of upstream and downstream relations between the nodes of the MBS service. The service distribution information is pre-configured and/or dynamically maintained. A service bearer corresponding to the MBS is established depending on the service distribution information. The establishment of the service bearer is pre-configured and/or dynamically maintained. Based on the MBS service bearer and data distribution relation between the nodes, the service data of the MBS is distributed between the MBS upstream and downstream nodes, and the data distribution relation is pre-configured, distributed by default, and/or dynamically maintained, so that the MBS data can be sent and received successfully.

When a downstream node needs to receive the MBS, the downstream node sends to an upstream node a registration request carrying identification information of the MBS, indicating the upstream node that the downstream node prepares to receive the MBS service data and requests to join the MBS.

After receiving the message, if a downstream node list maintained by the upstream node does not have information of the downstream node requesting to join the MBS and/or related nodes, the upstream node adds the downstream node and/or the related nodes to the downstream node list maintained by the upstream node. The upstream node may initiate an establishment of a bearer with the downstream node and/or related nodes in the downstream node list at this point to send a message indicating to establish the MBS bearer to the downstream node requiring to establish the bearer. Meanwhile, the upstream node may update a data distribution relation corresponding to the downstream node and/or the related nodes in the downstream node list and label it as distributing MBS service to the downstream node and/or the related nodes in the downstream node list.

Before a service session of the MBS is about to start, the upstream node sends a message indicating to establish an MBS bearer to the downstream node requiring to establish the bearer according to the maintenance thereof, so as to establish the bearer between the upstream node and the downstream node.

The message indicating to establish the bearer of the MBS corresponding to the identification information of the MBS sent from the upstream node to the downstream node includes one of or any combination of the following parameters: an MBS ID, a contents ID, an MCID, a QoS message required by the MBS, an estimated duration of the MBS, related information of a bearer tunnel, an IP multicast address, and information of a service classifier, so that the downstream node can establish the corresponding bearer successfully.

In the above manner, the establishment of the bearer is very flexible, which may be accompanied by the registration, or performed at the start of the service session, or pre-configured. After a certain node is registered, bearers of related nodes in the downstream node list may also be established together at the same time when a bearer of the node is established. Meanwhile, due to the existence of the data distribution relation, data may also be allowed not to be distributed to the bearer when the bearer is established. The data distribution relation may be pre-configured, distributed by default, or dynamically maintained. In this manner, the network resources are saved, and meanwhile the time delay of service provision is shortened to ensure the user's experience.

When the MBS session ends, the upstream node sends to the downstream node a message indicating to stop sending the MBS service data to the node carrying identification information of the MBS, and after receiving the message, the downstream node deletes a bearer of the MBS corresponding to the identification information of the MBS with the upstream node. When the downstream node does not need to receive the MBS, the downstream node sends to the upstream node a message indicating to stop sending the MBS service data to the downstream node carrying the identification information of the MBS, and after receiving the message, the upstream node deletes a bearer of the MBS corresponding to the identification information of the MBS with the downstream node and/or modifies a data distribution relation corresponding to the node and labels it as not distributing data to the node. In this manner, the network side only distributes the MBS service data in a necessary range, so that the MBS session can be managed effectively.

The message indicating to stop sending the MBS service data to the downstream node sent from the upstream node to the downstream node or from the downstream node to the upstream node includes one of or any combination of the following parameters: an MBS ID, a contents ID, an SFID, a CID, an MCID, an LCID, a data path ID, and an IP multicast address, so that the node receiving the message may successfully find the MBS bearer required to be processed.

After the upstream node receives the message indicating to stop sending the MBS service data to the downstream node sent from the downstream node, the upstream node deletes the downstream node from a list of nodes receiving the MBS and/or modifies a data distribution relation corresponding to the node so as to label it as not distributing data to the node. It is ensured that the data of the MBS is no longer sent to the downstream node not requiring to receive the service data thereafter, so that the MBS session can be managed effectively.

Additionally, in an embodiment, the present invention further provides a communication system for MBS modification including an upstream node (that may also be a sending end) and a downstream node (that may also be a receiving end).

The downstream node includes: a receiving unit, adapted to receive a service modification request for modifying an MBS bearer of the downstream node sent from the upstream node; a processing unit, adapted to modify resources stored and reserved for the MBS service according to the received service modification request; and a return unit, adapted to feed back to the upstream node a response to the MBS service modification request.

Preferably, the upstream node includes an MBS server, an MBS proxy, and/or a gateway, and the downstream node includes an MBS proxy, a gateway, and/or a BS.

The details of the functions and processing of various units in this embodiment may refer to the realization process of the above corresponding methods, and will not be described herein again.

Although the present invention is diagrammatically represented and described through some preferred embodiments thereof, it will be apparent to those skilled in the art that various modifications and variations can be made to the form and details of the present invention without departing from the scope or spirit of the invention.

What is claimed is:

1. A method for bearer control and data distribution, comprising:
    storing, in at least one node of a multicast broadcast service (MBS), MBS service distribution information comprising information denoting upstream and downstream relations between nodes of the MBS service;
    establishing or maintaining a service bearer and a data distribution relation corresponding to the MBS according to the MBS service distribution information; and
    distributing service data of the MBS according to the service bearer and the data distribution relation;
    wherein a downstream node list corresponding to each node of the MBS service is stored in the respective nodes;
    wherein before an upstream node sends the service data of the MBS to a downstream node, the downstream node sends to the upstream node a registration request message indicating that the downstream node prepares to receive the MBS service data, and the registration request message carries identification information of the MBS; and
    wherein after receiving the registration request message, the upstream node establishes a service bearer with the downstream node initiating the MBS registration request or related nodes thereof in the downstream node list; and
    the related nodes in the downstream node list are downstream nodes located in same MBS zone as the downstream node initiating the registration request in the downstream node list corresponding to the MBS maintained by the upstream node or all downstream nodes in the downstream node list.

2. The method for bearer control and data distribution according to claim 1, wherein if the downstream node sending the registration request message indicating that the downstream node prepares to receive the MBS service data or related nodes thereof are outside the downstream node list maintained by the upstream node, the upstream node adds the downstream node or the related nodes thereof to the downstream node list maintained by the upstream node; and
    the related nodes are downstream nodes located in same MBS zone as the downstream node sending the registration request message in a management range of the upstream node for the MBS service or one or more downstream nodes in a management range of the upstream node for the MBS service.

3. The method for bearer control and data distribution according to claim 1, wherein the upstream node sends to the downstream node requiring to establish the bearer, a message indicating to establish a bearer of the MBS corresponding to the identification information of the MBS; and
    on receiving the message, the downstream node establishes the bearer of the MBS with the upstream node;
    the message indicating to establish the bearer of the MBS corresponding to the identification information of the MBS comprises one of or any combination of the following parameters:
    an MBS identifier ID, a contents ID, a multicast connection ID MCID, quality of service QoS information required by the MBS, an estimated duration of the MBS, related information of a bearer tunnel, an IP multicast address, information of a service classifier, physical layer parameters, an MBS zone ID, an MBS group security association MBS GSA ID, a service flow ID SFID, a flow ID, an MBS security key, and an MBS security key context.

4. The method for bearer control and data distribution according to claim 1, wherein the upstream node updates a data distribution relation corresponding to the downstream node initiating the registration request or related nodes thereof, and labels the data distribution relation as distributing the MBS service data to the downstream node or the related nodes thereof.

5. The method for bearer control and data distribution according to claim 1, wherein after the service bearer is established, the upstream node determines whether to distribute data to the downstream node according to a data distribution relation corresponding to the downstream node.

6. The method for bearer control and data distribution according to claim 1, wherein the downstream node is at least one of a BS, a gateway, and an MBS proxy; and
    the upstream node is at least one of a gateway, an MBS proxy, and an MBS server.

7. The method for bearer control and data distribution according to claim 1, wherein the service bearer and the data distribution relation corresponding to the MBS are established or maintained in one of the following manners:
    pre-configuring the service bearer and the data distribution relation corresponding to the pre-configured service bearer;
    keeping the data distribution relation consistent with the establishment of the service bearer to distribute data during the establishment of the service bearer; and
    making the data distribution relation independent of the establishment of the service bearer.

* * * * *